(12) United States Patent
Eminoglu et al.

(10) Patent No.: US 10,625,361 B2
(45) Date of Patent: Apr. 21, 2020

(54) METHOD OF WELDING SUPERALLOYS

(71) Applicant: General Electric Company, Schenectady, NY (US)

(72) Inventors: Cem Murat Eminoglu, Simpsonville, SC (US); Yan Cui, Greer, SC (US); Daniel James Dorriety, Travelers Rest, SC (US); Brian Lee Tollison, Honea Path, SC (US); Paul Albert Cook, Greenville, SC (US)

(73) Assignee: General Electric Company, Schenectady, NY (US)

( * ) Notice: Subject to any disclaimer, the term of this patent is extended or adjusted under 35 U.S.C. 154(b) by 420 days.

(21) Appl. No.: 15/622,605

(22) Filed: Jun. 14, 2017

(65) Prior Publication Data

US 2018/0361495 A1 Dec. 20, 2018

(51) Int. Cl.
*B23K 1/00* (2006.01)
*B23K 9/16* (2006.01)
(Continued)

(52) U.S. Cl.
CPC ............ *B23K 9/164* (2013.01); *B23K 1/0018* (2013.01); *B23K 1/19* (2013.01); *B23K 9/0203* (2013.01);
(Continued)

(58) Field of Classification Search
CPC ........ B23K 9/164; B23K 1/19; B23K 35/304; B23K 2101/001; B23K 2103/26;
(Continued)

(56) References Cited

U.S. PATENT DOCUMENTS 3,346,951 A * 10/1967 Gwyn, Jr. ............ H01H 11/048
29/879
4,152,816 A * 5/1979 Ewing ..................... B22F 7/062
29/889.2
(Continued)

FOREIGN PATENT DOCUMENTS

DE 102015219345 A1 4/2017
EP 1844888 A1 10/2007
(Continued)

OTHER PUBLICATIONS

Extended European Search Report and Opinion issued in connection with corresponding EP Application No. 18175727.9, dated Nov. 26, 2018, 7 pages.

*Primary Examiner* — Kiley S Stoner
(74) *Attorney, Agent, or Firm* — James Pemrick; Hoffman Warnick LLC

(57) ABSTRACT

A method of welding a superalloy component includes the following sequential steps. A welding step for welding a cavity using a filler metal in an inert atmosphere, where the cavity is located in the component. A covering step for covering the filler metal and a portion of the component with a weld filler layer in the inert atmosphere. The weld filler layer has a greater ductility than material comprising the component and/or material comprising the filler metal. A second covering step for covering the weld filler layer with a braze material, and subsequently performing a brazing operation. A heat treating step heat treats the component.

17 Claims, 3 Drawing Sheets

(51) Int. Cl.

| | | |
|---|---|---|
| *B23K 1/19* | (2006.01) | |
| *B23K 35/30* | (2006.01) | |
| *B23K 9/04* | (2006.01) | |
| *B23K 9/02* | (2006.01) | |
| *B23K 26/34* | (2014.01) | |
| *B23P 6/00* | (2006.01) | |
| *B23K 26/12* | (2014.01) | |
| *B23K 26/21* | (2014.01) | |
| *B23K 26/144* | (2014.01) | |
| *B23K 9/173* | (2006.01) | |
| *F01D 5/00* | (2006.01) | |
| *B23K 101/00* | (2006.01) | |
| *B23K 103/18* | (2006.01) | |

(52) U.S. Cl.
CPC ............... *B23K 9/04* (2013.01); *B23K 9/16* (2013.01); *B23K 9/173* (2013.01); *B23K 26/123* (2013.01); *B23K 26/144* (2015.10); *B23K 26/21* (2015.10); *B23K 26/34* (2013.01); *B23K 35/304* (2013.01); *B23P 6/007* (2013.01); *F01D 5/005* (2013.01); *B23K 2101/001* (2018.08); *B23K 2103/26* (2018.08); *C21D 2241/02* (2013.01); *F05D 2230/232* (2013.01); *F05D 2230/235* (2013.01); *F05D 2230/237* (2013.01); *F05D 2230/42* (2013.01); *F05D 2230/80* (2013.01); *F05D 2300/175* (2013.01)

(58) Field of Classification Search
CPC ...... B23K 1/0018; B23K 9/0203; B23K 9/04; B23K 9/16; B23K 9/173; B23K 26/123; B23K 26/34; B23K 26/21; B23K 26/144; B23K 31/02; B23K 37/00; B23K 2103/04–05; C21D 2241/02; F05D 2230/80; F05D 2300/175; F05D 2230/232; F05D 2230/237; F05D 2230/235; F05D 2230/42; B23P 6/007; B23P 2700/13; F01D 5/005
USPC ...... 228/119, 101, 245–262, 262.41–262.42, 228/175
See application file for complete search history.

(56) References Cited

U.S. PATENT DOCUMENTS

| | | | |
|---|---|---|---|
| 4,285,459 A | 8/1981 | Baladjanian | |
| 4,326,833 A * | 4/1982 | Zelahy | B23P 6/005 29/402.13 |
| 4,581,300 A * | 4/1986 | Hoppin, III | B23K 20/00 428/546 |
| 4,624,402 A * | 11/1986 | Pitcairn | B23K 9/048 228/119 |
| 5,071,054 A * | 12/1991 | Dzugan | B23K 20/021 228/119 |
| 5,674,419 A * | 10/1997 | Koide | B23K 31/02 148/524 |
| 5,735,044 A * | 4/1998 | Ferrigno | B23P 6/007 29/889.1 |
| 5,806,751 A | 9/1998 | Schaefer | |
| 5,873,703 A * | 2/1999 | Kelly | B23K 1/0018 228/119 |
| 5,897,801 A * | 4/1999 | Smashey | B23K 9/0026 148/524 |
| 5,951,792 A * | 9/1999 | Balbach | B23K 20/021 148/527 |
| 6,049,060 A | 4/2000 | Smashey | |
| 6,321,450 B1 * | 11/2001 | Semenov | B23K 31/02 29/469 |
| 10,384,316 B2 * | 8/2019 | Goncharov | B23K 9/167 |
| 2007/0039177 A1 * | 2/2007 | Yoshioka | B23K 1/0018 29/889.1 |
| 2007/0241169 A1 * | 10/2007 | Arnett | B23K 1/0018 228/165 |
| 2008/0135604 A1 * | 6/2008 | Ng | B23K 1/0018 228/194 |
| 2009/0014421 A1 | 1/2009 | Sathian | |
| 2009/0250447 A1 * | 10/2009 | Guth | B23K 33/004 219/137 R |
| 2009/0297701 A1 | 12/2009 | Jabado | |
| 2011/0042361 A1 * | 2/2011 | Nowak | B23K 26/0604 219/121.64 |
| 2011/0248071 A1 * | 10/2011 | Kiuchi | B23K 9/04 228/119 |
| 2012/0096713 A1 * | 4/2012 | Manjooran | B23P 6/007 29/889.1 |
| 2012/0103950 A1 * | 5/2012 | Arjakine | B23K 9/04 219/121.64 |
| 2012/0118936 A1 * | 5/2012 | Ikeda | B23K 35/0261 228/56.3 |
| 2012/0211548 A1 * | 8/2012 | Clark | B23P 6/005 228/119 |
| 2016/0175998 A1 * | 6/2016 | Ozbaysal | B23K 1/0018 148/528 |
| 2016/0236298 A1 * | 8/2016 | Ols | B23K 35/0244 |
| 2016/0243650 A1 * | 8/2016 | Lin | B22F 7/062 |
| 2016/0314860 A1 * | 10/2016 | Kamo | G21C 19/207 |
| 2017/0100804 A1 * | 4/2017 | Goncharov | C22F 1/10 |
| 2017/0239760 A1 * | 8/2017 | Argentine | C22C 19/055 |
| 2017/0266749 A1 * | 9/2017 | Whims | B23K 9/0026 |
| 2017/0334025 A1 * | 11/2017 | Reimers | B23K 9/04 |
| 2018/0250776 A1 * | 9/2018 | Cui | B23K 26/211 |
| 2018/0250777 A1 * | 9/2018 | Cui | B23K 9/044 |
| 2018/0257181 A1 * | 9/2018 | Goncharov | B23K 15/0086 |
| 2018/0361495 A1 * | 12/2018 | Eminoglu | B23K 9/164 |
| 2019/0047094 A1 * | 2/2019 | Puidokas | B23K 26/342 |

FOREIGN PATENT DOCUMENTS

| | | | | |
|---|---|---|---|---|
| EP | 2404695 A1 | 1/2012 | | |
| JP | 2005342857 A | * 12/2005 | | |
| WO | 2014051830 A1 | 4/2014 | | |
| WO | WO-2018142518 A1 | * 8/2018 | ............... | B23K 1/00 |

* cited by examiner

METHOD OF WELDING SUPERALLOYS

BACKGROUND OF THE INVENTION

This invention relates to joining technology generally, and specifically, to a welding method for joining components fabricated of high gamma prime superalloys.

Rene 108 is one superalloy that is becoming a desired material of choice for blades, nozzles, and shrouds in advanced gas turbines. Rene 108 and other high gamma prime superalloys have excellent mechanical and oxidation properties at elevated temperatures. However, Rene 108 and other high gamma prime superalloys have poor weldability and are some of the hardest to weld materials in the superalloy category. Welding on Rene 108 or other high gamma prime superalloys using any traditional welding procedures results in significant cracking in the weld metal and base metal heat affected zone. Laser welding or laser hybrid welding of Rene 108 and other high gamma prime superalloys generates undesirable cracks along the weld line. Generally, the cracks produced from laser welding are perpendicular to the welding joint. Undesirable cracks along the weld line lead to unacceptable welds.

In the past, known methods have attempted to use a ductile material over the weld. However, cracking still occurred after welding. Other methods have used a braze over the weld, but again cracking was a problem. The inevitable cracks in the base metal or filler material could never be successfully filled. To date, no suitable method has been disclosed for successfully welding high gamma prime superalloys, such as Rene 108.

BRIEF DESCRIPTION OF THE INVENTION

In an aspect of the present disclosure, a method of welding a superalloy component, includes the following sequential steps. A welding step for welding a cavity using a filler metal in an inert atmosphere. The cavity is located in the component. A covering step for covering the filler metal and a portion of the component with a weld filler layer in the inert atmosphere. The weld filler layer has a greater ductility than material comprising the component and the weld filler layer has a greater ductility than material comprising the filler metal. A second covering step for covering the weld filler layer with a braze material. A brazing operation is then subsequently performed. A heat treating step is performed after the brazing step for heat treating the component. The superalloy component is comprised of a high gamma prime superalloy. The high gamma prime superalloy may be B-1900, GTD-111, Inconel 100, Inconel 713, Inconel 738, Inconel 792, Inconel 939, MAR-M-246, MAR-M-509, Rene 77, Rene 108, Rene 125, U-500, CM 247, or Mar M 247. The filler metal may be GTD-262, GTD-111, R-108LC, R-108, MarM 247, IN 738, GTD-222. The inert atmosphere is argon gas, nitrogen gas, helium gas or carbon dioxide gas. The weld filler layer may be nickel, H-230, Inconel 600, Inconel 617, Inconel 625, or Yanalloy. The braze material may be D15, DF-4B, Amdry 788, MM509B, Amdry 775, high melt/low melt mixtures of braze alloys, 50% Ni/50% D15, 60% IN625/40% Amdry 788, 50% MarM 247/50% DF-4B. The heat treating step includes a hot isostatic pressing heat treatment, and a solution heat treatment step performed after the hot isostatic pressing heat treatment step. The hot isostatic pressing heat treatment may be performed at a temperature lower than a braze temperature used in the brazing operation.

In another aspect of the present disclosure, a method of welding a superalloy component includes the following sequential steps. A welding step that welds a cavity using a filler metal in an inert atmosphere. The cavity is located in the component. A first covering step that covers the filler metal and a portion of the component with a weld filler layer in the inert atmosphere. The weld filler layer has a greater ductility than material comprising the component and material comprising the filler metal. A second covering step covers the weld filler layer with a braze material, and a brazing operation is subsequently performed. A heat treating step heat treats the component with a hot isostatic pressing heat treatment.

In yet another aspect of the present disclosure, a method of welding a high gamma prime superalloy component includes the following sequential steps. A welding step for welding a cavity using a filler metal in an inert atmosphere. The inert atmosphere is at least one of, argon gas, nitrogen gas, helium gas or carbon dioxide gas. The cavity is located in the component. A first covering step for covering the filler metal and a portion of the component with a weld filler layer in the inert atmosphere. The weld filler layer has a greater ductility than material comprising the component and/or material comprising the filler metal. A second covering step for covering the weld filler layer with a braze material. A brazing step/operation is also performed. A heat treating step for feat treating the component with a hot isostatic pressing heat treatment, and then subsequently performing a solution heat treatment.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," and "the" are intended to mean that there are one or more of the elements.

The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

Figure 1:
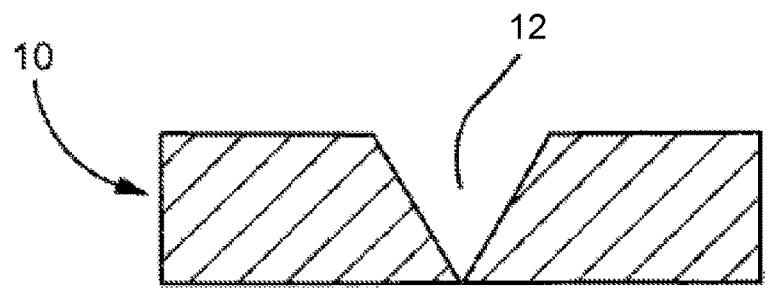
FIG. 1 illustrates a cross-section of a high gamma prime superalloy component with a weld prep notch formed in the facing surface of the component.

FIG. 1 illustrates a high gamma prime superalloy component 10 with a V-shaped weld prep notch 12 formed in the facing surface of the component. Notch 12 may also be referred to as a groove or cavity. Examples of high gamma prime superalloys are Rene 108 (Balance Ni, 0.07% C, 8% Cr, 9% Co, 0.5% Mo, 3.2% Ta, 0.7% Ti, 5.6% Al, 0.015% B, 0.01% Zr 1.4% Hf), CM 247 (also known as Rene 108), Mar M 247 (Balance Ni, 0.15% C, 15.5% Cr, 9.5% Co, 2% Mo, 3.8% W, 2% Nb, 1.8% Ti, 4.3% Al, 0.015% B, 0.05% Zr), Udimet 700 (Balance Ni, 0.07% C, 15% Cr, 18.5% Co, 5% Mo, 3.5% Ti, 4.4% Al, 0.025% B), Inconel 939 (Balance Ni, 0.15% C, 22.4% Cr, 19% Co, 1.6% W, 1% Nb, 1.4% Ta, 3.7% Ti, 1.9% Al, 0.01% B, 0.1% Zr), Inconel 738 (Balance Ni, 0.09-0.17% C, 16% Cr, 8.5% Co, 1.7% Mo, 2.5% W, 0.8% Nb, 1.7% Ta, 3.5% Ti, 3.5% Al, 0.01% B, 0.0500.1% Zr), Rene 80 (Balance Ni, 0.16% C, 14% Cr, 9.5% Co, 4% Mo, 4% W, 5% Ti, 3% Al, 0.015% B, 0.03% Zr), GTD 444 (Balance Ni, 0.1% C, 0.75% Cr, 7.5% Co, 1.5% Mo, 6% W, 4.8% Ta, 3.6% Ti, 4.23% Al), B-1900, GTD-111, Inconel 100, Inconel 713, Inconel 738, Inconel 792, MAR-M-246, MAR-M-509, Rene 77, Rene 125, U-500, and CMSX single crystal alloys. All percent (%) values are weight percent. It will be appreciated that other shaped recesses could be formed in a component having a defect such as a crack to be repaired, with the crack excavated (i.e., routed or machined) to form a V-shaped, rectangular shaped, oval shaped or other suitably shaped groove similar to the effect of notch 12.

Figure 2:
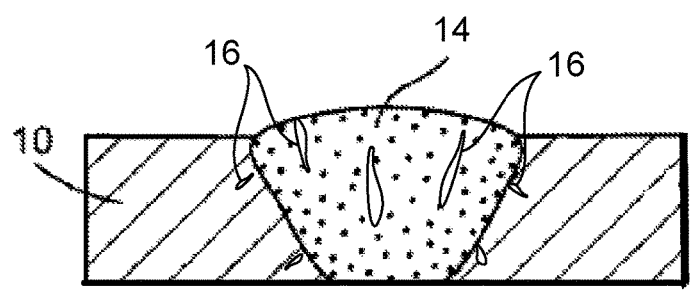
FIG. 2 illustrates a cross-section of the component after welding.

With reference now to FIG. 2, the component 10 has been welded, with filler material 14 filling the groove 12 and fusing the component 10 and filler material 14 together. Welding may be carried out with any suitable conventional welding technique including gas-tungsten-arc welding, plasma-arc welding and the like. The welding process is implemented in an inert atmosphere at ambient temperature, i.e., above 60° F. and not otherwise forcibly heated. However, welding could be done at an elevated temperature if desired. Any suitable high strength weld filler material 14, including filler material with high gamma prime content, may be employed. Non-limiting examples of suitable filler materials are GTD-262, Rene 41 (Balance Ni, 0.09% C, 19% Cr, 11% Co, 9.75% Mo, 3.15% Ti, 1.65% Al, 0.005% B), GTD-111, Rene 108LC, Rene 108, Mar M 247, Inconel 738, Inconel 738LC, and GTD-222. The term "inert atmosphere" refers to a gaseous mixture that contains little or no oxygen and primarily consists of one or more non-reactive gases or gases that have a high threshold before they react. Non-limiting examples of such gases are, argon, nitrogen, helium or carbon dioxide. The welding is performed in an inert atmosphere to eliminate/reduce the risk of oxidation. After the welding step, cracks 16 will have inevitably formed in both the filler material 14 and heat affected zone in the base material of the component 10.

Figure 3:
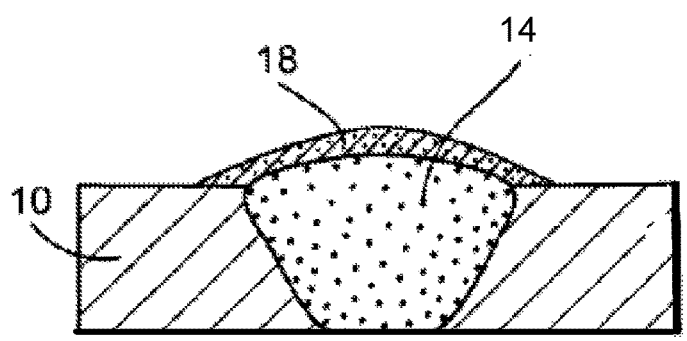
FIG. 3 illustrates a cross-section of the component after a ductile weld filler layer has been deposited.

Subsequently and with reference now to FIG. 3, the surfaces in the fusion zone, i.e., the exposed weld filler surface and adjacent surfaces of the component part, are covered (or sealed) with a ductile weld filler material 18. Superalloys, such as Rene-108, have essentially a zero ductility. The ductile weld filler material 18 will have a ductility greater than zero (and greater than the ductility of material comprising component 10 or filler material 14). Some non-limiting alloy examples of ductile weld filler 18 materials are, Inconel 625 (Balance Ni, 20-23% Cr, 8-10% Mo, 3.15-4.15% Nb+Ta, 0-0.1% C, 0-5% FE, 0-0.5%, Si, 0.0.5% Mn, 0.0.015% S, 0.0.015% P, 0.0.4% Ti, 0-1% Co, 0.0.4% Al), Hastelloy X (Balance Ni, 8-10% Mo, 20.5-23% Cr, 17-20% Fe, 0.2-1% W, 0.5-2.5% Co, 0.05-0.015% C, 0-1% Si, 0-1% Mn, 0-0.01% B, 0-0.04% P, 0-0.03% S), pure nickel (~100% Ni), Inconel 718 (Balance, Fe, 50-55% Ni+Co, 17-21% Cr, 2.8-3.3% Mo, 0.65-1.15% Ti, 0.35-0.8 Al, 0.001-0.006% B, 4.75-5.5% Nb+Ta, 0-0.08% C, 0-0.35% Mn, 0.0.35% Si, 0-0.015 P, 0-0.015% S, 0-1% Co, 0-0.15% Cu), Inconel 600 (minimum 72% Ni, 14-17% Cr, 6-10% Fe, 0-0.1% C, 0-0.5% Si, 0-1% Mn, 0-0.015% S, 0-0.5% Cu), H-230, Inconel 617, or Yanalloy. The thickness of layer 18 should be sufficient to cover filler material 14, and may range between about 0.025 inches to about 0.150 inches, or any suitable thickness as desired in the specific application. This step is also performed in an inert atmosphere. After this step small cracks or sub-cracks will still exist in the component 10 and/or filler material 14.

Figure 4:
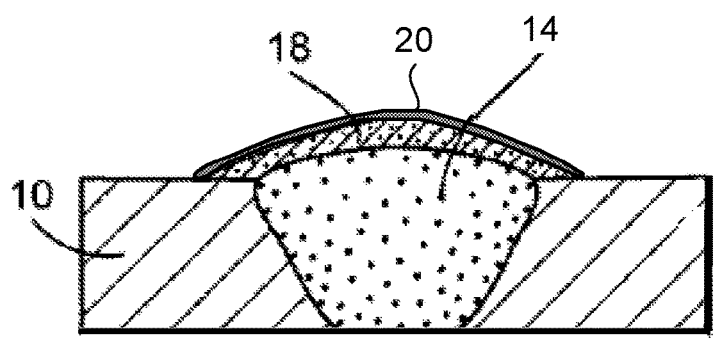
FIG. 4 illustrates a cross-section of the component after the braze material has been deposited.

Subsequently and with reference now to FIG. 4, the surfaces in the fusion zone are covered with a braze material, braze paste or braze paste mixture 20. The braze material 20 can be either a pure braze alloy, e.g., D-15 (Balance Ni, 15% Cr, 10.25% Co, 3.5% Ta, 3.5% Al, 2.3% B), AMS 4782 (71% Ni, 19% Cr, 10% Si), DF-4B (Balance Ni, 14% Cr, 10% Co, 3.5% Al, 2.75% B, 2.5% Ta, 0.05% Y), Amdry 788 (Balance Co, 22% Cr, 21% Ni, 14% W, 2% B, 2% Si, 0.03% La) or a mixture of e.g., AMS 4782 and a powder of the superalloy Inconel 738, Inconel 625, Inconel 718, Haynes 230 (57%-Balance Ni, 22%, Cr, 14% W, 2% Mo, 3% max Fe, 5% max Co, 0.5% Mn, 0.4% Si, 0.5% max Nb, 0.3% Al, 0.1% max Ti, 0.1% C, 0.02% La, 0.015% max B), MM509B, Amdry 775, braze alloy high melt/low melt mixtures, 50% Ni/50% D15, 60% IN625/40% Amdry 788, or 50% MarM 247/50% DF-4B. The brazing step does not have to be performed in an inert atmosphere. The brazing step includes brazing at a temperature of about 2100 F to about 2300 F. The brazing step will fill the small cracks or sub-cracks remaining after the previous ductile weld filler step. After the brazing step, the component is subjected to a hot isostatic pressing heat treatment to compress and collapse the remaining cracks 16, and after this heat treatment a solution heat treatment is performed. The component may then be machined to remove any undesired weld or brazing material, if desired.

Figure 5:
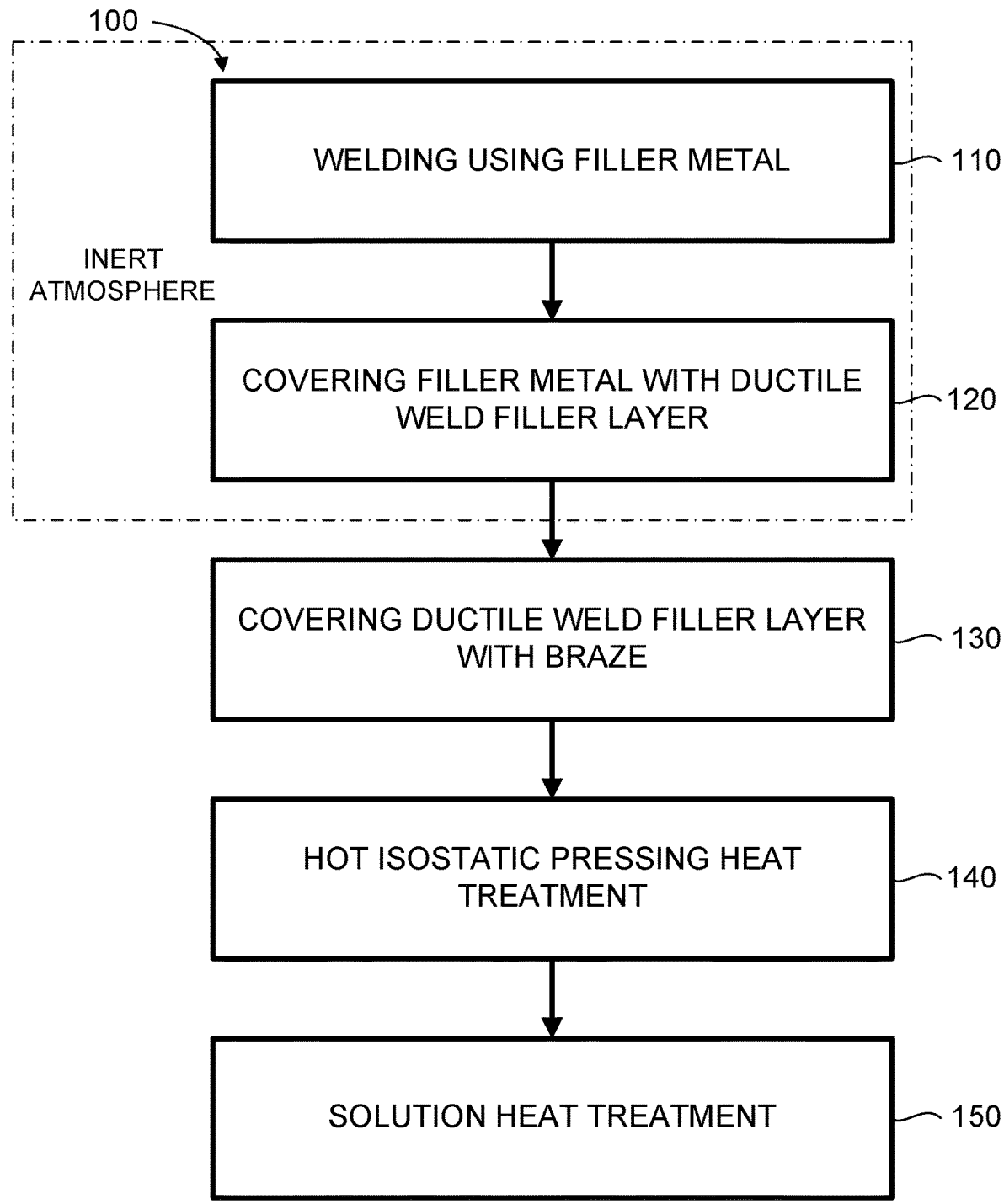
FIG. 5 illustrates a flowchart of the method of welding a superalloy component.

FIG. 5 is a flowchart of the method 100 of welding a superalloy component 10. The following steps are performed sequentially. The method 100 includes a welding step 110, that welds a filler metal 14 in a cavity, notch or groove 12 in the superalloy component 10. As one example only, if the component 10 is comprised of Rene-108, then the filler metal 14 may be GTD-262 or other superalloy weld filler material. The welding is performed under an inert atmosphere, such as nitrogen gas or argon gas. Inevitably, cracks 16 will be present after the welding step.

In step 120, the filler metal 14 is covered with a ductile weld filler layer 18. The ductility of the weld filler layer is greater than the ductility of the component 10 material and the filler metal 14. As one non-limiting example only, the ductility of the weld filler layer 18 is 10% or more than the ductility of filler metal 14. In step 130, the ductile weld filler layer 18 is covered with braze material 20. The braze material may be D15, DF-4B, Amdry 788, or a mixture of high melt/low melt; for example (50% Amdry 625/50% Amdry 788). In step 140 the component is subjected to a hot isostatic pressing (HIP) heat treatment that crushes and collapses the cracks 16. As one non-limiting example only, the HIP temperature is at least about 25 F below the cladding temperature, and HIP heat treatment may be performed at a temperature of about 2,200 F and a pressure of about 15,000 pounds per square inch. Step 140 is followed by a solution heat treatment and/or age heat treatment. The ductile weld filler and the braze flow into and fill the surface cracks 16 and any small or sub-cracks in the component heat affected zone or weld filler material 14. The combination of ductile weld material and braze has the following technical advantage, the ductile weld material seals the main weld filler material and closes the contact of the cracks in the main weld filler material with the braze material, so that braze cannot flow into these cracks hence effecting the ductility of this weld filler. The result is a crack free or essentially crack free welded super alloy component.

Figure 6:
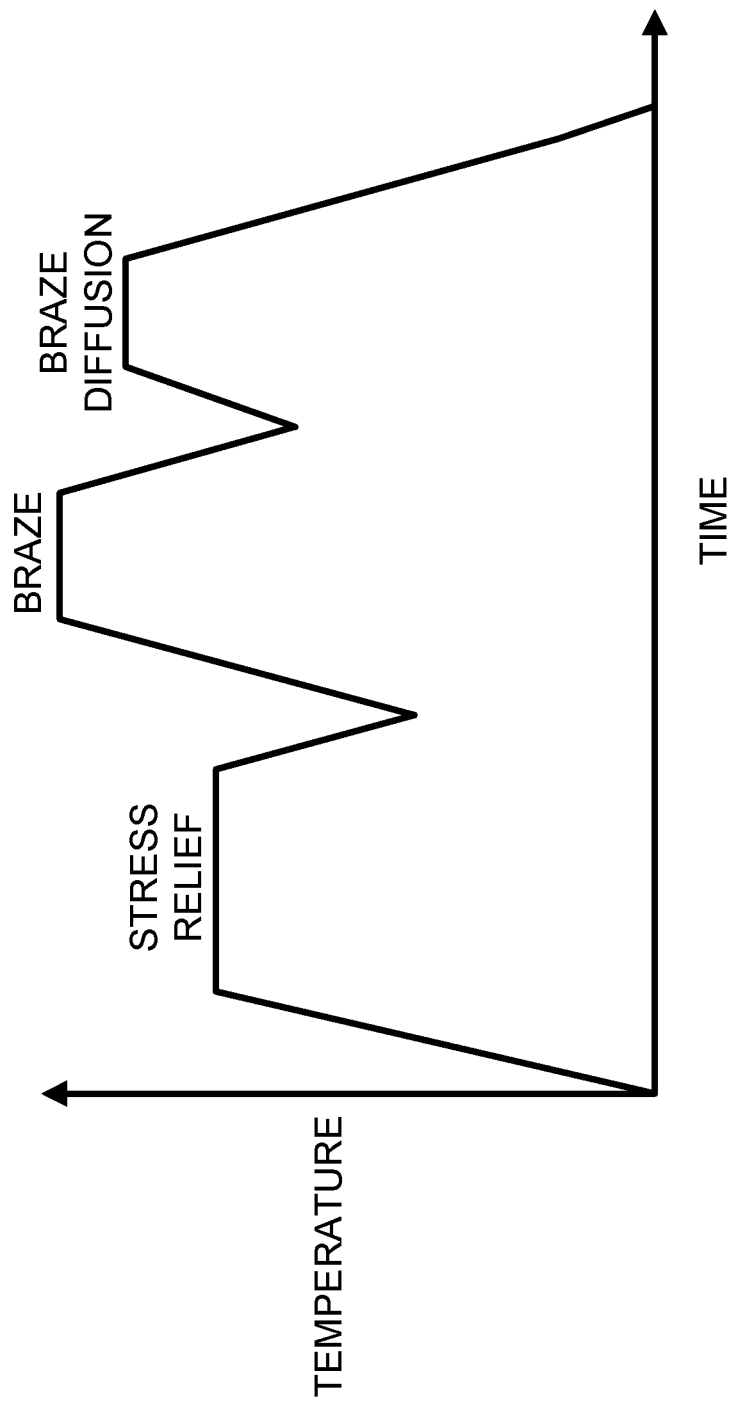
FIG. 6 illustrates a graph of a heat treatment cycle.

FIG. 6 is a graph of a heat treatment cycle. After step 130, the welded component is vacuum-heat-treated in a process that includes a stress relief cycle, a braze cycle and a braze diffusion cycle. In this regard, FIG. 6 illustrates a suitable heat treatment process indicating that after the stress relief cycle, the component parts are allowed to cool before the temperature is increased to a higher braze temperature which is followed by a braze diffusion cycle, and then cooling to ambient temperature. Specific temperature ranges for the cycles are known to those skilled in the art. Brazing temperatures range from about 2,050 F to about 2,250 F and solution temperatures will be about 1,975 F to about 2,200 F. An important aspect of the process is that the weld is permitted to crack initially during or just after welding, but any such crack is "healed" or repaired during HIP heat treatment. The end result is a fused region of the superalloy component that is free of cracks, thus solving the above mentioned problem of welding superalloys that are high in gamma prime content.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. The terms "about" and "approximately" as applied to a particular value of a range applies to both values, and unless otherwise dependent on the precision of the instrument measuring the value, may indicate +/−10% or +/−20% of the stated value(s).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method of welding a superalloy component, the method comprising the following sequential steps:
   (a) welding a cavity using a filler metal in an inert atmosphere, the cavity located in the component;
   (b) covering the filler metal and a portion of the component with a weld filler layer in the inert atmosphere, the weld filler layer having an approximately 10% greater ductility than material comprising the component and material comprising the filler metal;
   (c) covering the weld filler layer with a braze material, and performing a brazing operation at a temperature of 2100 to 2300 degrees F.; and
   (d) heat treating the component with a hot isostatic pressing (HIP) heat treatment, the HIP heat treatment including a stress relief cycle at a temperature approximately 25 degrees F. less than the brazing operation and at a pressure of approximately 15,000 pounds per square inch, followed by a brazing cycle at a temperature of 2050 to 2250 degrees F., followed by a braze diffusion cycle, followed by cooling to an ambient temperature.

2. The method of claim 1, the superalloy component comprised of a high gamma prime superalloy.

3. The method of claim 2, the high gamma prime superalloy comprising at least one of:
   B-1900, GTD-111, Inconel 100, Inconel 713, Inconel 738, Inconel 792, Inconel 939, MAR-M-246, MAR-M-509, Rene 77, Rene 108, Rene 125, or U-500, CM 247, Mar M 247.

4. The method of claim 1, the filler metal comprising one of:
   GTD-262, GTD-111, R-108LC, R-108, MarM 247, IN 738, GTD-222.

5. The method of claim 1 the inert atmosphere comprising:
   argon gas, nitrogen gas, helium gas or carbon dioxide gas.

6. The method of claim 1, the weld filler layer comprising at least one of:
   nickel, H-230, Inconel 600, Inconel 617, Inconel 625, or Yanalloy.

7. The method of claim 1, the braze material comprising at least one of:
   D15, DF-4B, Amdry 788, MM509B, Amdry 775, braze alloy high melt/low melt mixtures, 50% Ni/50% D15, 60% IN625/40% Amdry 788, 50% MarM 247/50% DF-4B.

8. The method of claim 1, the heat treating step further comprising:
   a solution heat treatment step performed after the hot isostatic pressing heat treatment step.

9. A method of welding a superalloy component, the method comprising the following sequential steps:
   (a) welding a cavity using a filler metal in an inert atmosphere, the cavity located in the component;
   (b) covering the filler metal and a portion of the component with a weld filler layer in the inert atmosphere, the weld filler layer having an approximately 10% greater ductility than material comprising the component and material comprising the filler metal;
   (c) covering the weld filler layer with a braze material, and performing a brazing operation at a temperature of 2100 to 2300 degrees F.;
   (d) heat treating the component with a hot isostatic pressing heat (HIP) treatment, the HIP treatment including a stress relief cycle at a temperature approximately 25 degrees F. less than the brazing operation and at a pressure of approximately 15,000 pounds per square inch, followed by a brazing cycle at a temperature of 2050 to 2250 degrees F., followed by a braze diffusion cycle, followed by cooling to an ambient temperature; and (e) a solution heat treatment step performed after the hot isostatic pressing heat treatment step.

10. The method of claim 9, the superalloy component comprised of a high gamma prime superalloy.

11. The method of claim 10, the high gamma prime superalloy comprising at least one of:
B-1900, GTD-111, Inconel 100, Inconel 713, Inconel 738, Inconel 792, Inconel 939, MAR-M-246, MAR-M-509, Rene 77, Rene 108, Rene 125, or U-500, CM 247, Mar M 247.

12. The method of claim 9, the filler metal comprising one of:
GTD-262, GTD-111, R-108LC, R-108, MarM 247, IN 738, GTD-222.

13. The method of claim 9 the inert atmosphere comprising:
argon gas, nitrogen gas, helium gas or carbon dioxide gas.

14. The method of claim 9, the weld filler layer comprising at least one of:
nickel, H-230, Inconel 600, Inconel 617, Inconel 625, or Yanalloy.

15. The method of claim 9, the braze material comprising at least one of:
D15, DF-4B, Amdry 788, MM509B, Amdry 775, braze alloy high melt/low melt mixtures, 50% Ni/50% D15, 60% IN625/40% Amdry 788, 50% MarM 247/50% DF-4B.

16. A method of welding a high gamma prime superalloy component, the method comprising the following sequential steps:

(a) welding a cavity using a filler metal in an inert atmosphere, the inert atmosphere comprising at least one of: argon gas, nitrogen gas, helium gas or carbon dioxide gas; the cavity located in the component;

(b) covering the filler metal and a portion of the component with a weld filler layer in the inert atmosphere, the weld filler layer having an approximately 10% greater ductility than material comprising the component and material comprising the filler metal;

(c) covering the weld filler layer with a braze material, and performing a brazing operation at a temperature of 2100 to 2300 degrees F.; and (d) heat treating the component with a hot isostatic pressing (HIP) heat treatment, the HIP heat treatment including a stress relief cycle at a temperature approximately 25 degrees F. less than the brazing operation and at a pressure of approximately 15,000 pounds per square inch, followed by a brazing cycle at a temperature of 2050 to 2250 degrees F., followed by a braze diffusion cycle, followed by cooling to an ambient temperature, and then subsequently performing a solution heat treatment at a temperature of 1975 to 2200 F.

17. The method of claim 16, further comprising:
the high gamma prime superalloy comprising at least one of: B-1900, GTD-111, Inconel 100, Inconel 713, Inconel 738, Inconel 792, Inconel 939, MAR-M-246, MAR-M-509, Rene 77, Rene 108, Rene 125, or U-500, CM 247, Mar M 247;
the filler metal comprising one of: GTD-262, GTD-111, R-108LC, R-108, MarM 247, IN 738, GTD-222;
the weld filler layer comprising at least one of: nickel, H-230, Inconel 600, Inconel 617, Inconel 625, or Yanalloy; and
the braze material comprising at least one of: D15, DF-4B, Amdry 788, MM509B, Amdry 775, braze alloy high melt/low melt mixtures, 50% Ni/50% D15, 60% IN625/40% Amdry 788, 50% MarM 247/50% DF-4B.

* * * * *